2,856,375

FIBER-FORMING POLYESTERS OF BIS-ACETOXYMETHYL DURENE

Louis A. Mikeska, Westfield, N. J., assignor to Esso Research and Engineering Company, a corporation of Delaware No Drawing. Application August 27, 1954
Serial No. 452,722

9 Claims. (Cl. 260—63)

The invention relates to novel polyesters obtained by condensing an aromatic diol with a dibasic acid. In its preferred embodiment it relates to fiber-forming resins obtained by condensing bis-hydroxymethyl durene or the like with sebacic, adipic, terephthalic or other suitable dibasic acid.

This application is a continuation-in-part of copending application Serial No. 280,366, filed April 3, 1952, now abandoned.

Synthetic fibers have been rapidly gaining in importance in recent years, because of technical as well as economic advantages. For instance, the cost of synthetic fibers is far more stable than that of natural fibers. Also, various synthetic fibers have been produced which surpass their natural counterparts in washability, abrasive and tensile strengths, moth-proofness, resistance to creasing, chemicals and natural organisms and so forth. At the same time the petroleum and chemical industries have been making great strides in producing an increasing variety of essentially pure aromatic hydrocarbons such as para-xylene and durene from various petroleum fractions and in converting such hydrocarbons into valuable chemical reagents.

It is an object of the present invention to provide a new type of synthetic fiber of superior quality. Another object is to convert aromatic hydrocarbons into a new kind of resinous polyester. Still other objects, as well as the nature and scope of the invention, will become apparent from the subsequent description.

It has now been discovered that valuable synthetic fibers can be made from polyesters derived from aromatic diols having the formula

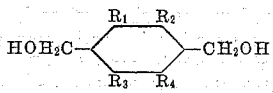

wherein $R_1$ through $R_4$ are radicals selected from the group consisting of hydrogen and methyl radicals. Bis-hydroxy-methyl durene is particularly preferred, since its symmetrical, compact but fully substituted aromatic structure contributes to an especially valuable combination of properties. However, somewhat similar fiber-forming resins can be obtained from other symmetrical homologues, notably 1,4-dihydroxymethyl-2,5-dimethyl-benzene and 1,4-dihydroxymethylbenzene. Where the product is not required for the formation of fibers, unsymmetrical homologues such as dihydroxymethyl iso-durene, the various dihydroxymethyl derivatives of o-xylene or toluene, 1,3-dihydroxymethyl benzene, and so forth, may be used. Moreover, instead of using the aforementioned aromatic compounds, it is possible to use the corresponding bis-hydroxy derivatives of cyclohexane, except that the resulting polyesters are apt to have substantially lower melting points than their aromatic counterparts.

These various bis-hydroxy compounds or diols can be obtained, for instance, by conversion of the corresponding bis-chloromethyl cyclic compound such as bis-chloromethyl durene, which in turn can be advantageously prepared by the method described in aforesaid copending application Serial No. 280,366. Using bis-chloromethyl durene as an example, this then can be converted to the diol by reacting it with sodium acetate in acid solution. This results in an almost quantitative yield of bis-acetoxymethyl durene which can then be condensed directly with a suitable dibasic acid, anhydride or ester, to form the desired polyester. Alternately, a good yield of bis-hydroxymethyl durene can be obtained by saponifying the acetoxymethyl durene. The bis-hydroxymethyl durene can then be condensed with the chloride of the suitable dibasic acid. In many instances the condensation reaction of the bis-hydroxy compound with the diacid chloride is faster and better than the corresponding reaction of the acetoxy compound with the dibasic acid proper. Of course, the acetoxy compound cannot be reacted with the acid chloride directly.

In brief, in accordance with the present invention the aromatic diol or diacyl compound is esterified with a substantially equimolar amount of a suitable dibasic acid or its equivalent such as its anhydride, ester or acyl chloride. The dibasic acid esters of $C_1$ to $C_3$ alcohols represent particularly convenient reagents. While either the diacid or the diol may be present in excess in the reaction mixture, a slight excess of the diacid compound, which also usually happens to be the more volatile reagent, may be helpful. Such an excess of the acid represses the formation of polyethers which otherwise may tend to occur by autocondensation of the diol. Accordingly, the use of reaction mixtures containing about 1.02 to 1.1 moles of dibasic acid compound per mole of aromatic diol may represent a desirable practice.

The dibasic acids particularly useful in the present invention are saturated acids having an even number of carbon atoms in the range of about 4 to 10, including aliphatic as well as aromatic acids. Especially good results have been achieved, for instance, with sebacic, suberic, adipic and terephthalic acids. Other useful acids include succinic and tetramethyl terephthalic acids which tend to give rather high melting products, as well as tetrahydroterephthalic, glutaric and azelaic acids which tend to give relatively low melting products. Acids having an odd number of carbon atoms generally tend to give lower melting polyesters than the even-numbered acids in the same range. Conversely, the smaller the molecular weight of the acids, the higher the melting point of the resulting polyester. Consequently, condensation of relatively short aliphatic acids such as succinic is particularly appropriate in conjunction with bis-hydroxymethyl benzene and similar diols which inherently tend to form relatively low melting products.

The esterification as such may be carried out in any convenient manner, e. g. by heating the mixture of diol and diacid or diacid chloride high enough to melt the solid reagents and continuing the heating in nitrogen or other inert gas until the condensation reaction has progressed to the desired extent. At this point the product can be drawn into monofilaments and, if desired, increased linear orientation of the filaments can be obtained by extrusion through spinnerets or cold drawing. Acid condensation catalysts such as toluene sulfonic acid monohydrate, zinc chloride or hydrogen chloride gas are useful, though not essential. Furthermore, when esters of the dibasic acids are used instead of the acids or their chlorides, then basic catalysts such as sodium methylate or ethylate, calcium hydroxide or zinc hydroxide are preferable to the acid catalysts. As indicated before, instead of esterifying the diol, the polyester can be prepared by reacting a diacetate or other simple diester of the diol with the dibasic acid or its diester.

The invention is more specifically illustrated by the following specific examples.

Example 1

A Claisen flask was charged with 27.8 gms. of bis-acetoxymethyl durene (M. W. 278), 20.2 gms. of sebacic acid (M. W. 202), and 0.075 gm. of toluene sulfonic acid monohydrate. Then while passing nitrogen through this mixture, the temperature was gradually raised to 240° C. over a period of about two hours. Thirty minutes later the flask was evacuated to 1 mm. Hg pressure and the heating was continued at 240° C. for four hours. The temperature was then raised to 280° C. for a short time in order to obtain a completely melted mass. At this stage the product could be drawn into threads of any desired length by applying a stirring rod to the melt, and pulling the thread as it was formed. The filaments were brittle, but their flexibility and strength could be improved considerably by cold drawing. The polyester consisted of a light colored, tough resin when cold. This resin was insoluble in common solvents.

Example 2

In this case the procedure was substantially the same as in Example 1, except that the charge consisted of 29.8 gms. of bis-acetoxymethyl durene and 14.6 gms. of adipic acid. No catalyst was used. In the initial stages nitrogen was passed through the reaction mixture.

The temperature was raised to 180° C. over a period of about 1½ hours and maintained at this point for about another hour and a half in order to insure partial esterification of all the adipic acid. Thereafter the temperature was raised to about 185° C., that is, above the boiling point of adipic anhydride. Later the temperature was raised to 220° C. To complete this reaction the mixture was finally heated at 250°–280° C. under 1 mm. Hg pressure.

On completion of the reaction the finished product consisted of a light colored resin which could be drawn into threads of any desired length. The resin had a relatively high melting point, above 240° C., and was substantially higher melting than the corresponding polyester of sebacic acid described in Example 1.

Example 3

Suberic acid can be similarly condensed with bis-acetoxymethyl durene. The resulting resin has a melting point which is intermediate to the adipate and sebacate polyesters and generally appears to have a particularly favorable balance of properties.

Example 4

In this example terephthalic acid was used instead of adipic acid. Otherwise the procedure was substantially the same as in Example 2. Acetic acid began to be given off at 180° C. and this temperature was maintained for about an hour and a half. Thereafter the reaction was brought to completion by heating for about 3½ hours at 250°–280° C. under 1 mm. Hg pressure, until the mixture thickened to a suitable viscosity. As in the previous examples, the product could be drawn into threads with great ease.

Example 5

When bis-hydroxymethyl durene is used instead of the diacetate in the above described reactions, the reaction has to be started at about 240° C. since this diol melts at a point about 100° C. higher than its acetate ester. The reaction then proceeds with the elimination of water rather than acetic acid. Accordingly, for instance, when bis-hydroxymethyl durene is condensed with a slight excess of adipic acid, an excellent fiber-forming resin is obtained which in general resembles the product of Example 2.

Example 6

As still another example bis-hydroxymethyl durene can be condensed with an equimolar amount of adipyl chloride while bubbling hydrogen chloride through the hot reaction mixture. Again an excellent fiber-forming resin is obtained. The condensation reaction with the acid chloride tends to proceed considerably faster than the analogous reaction of Example 2.

It will be understood that when speaking herein generically of dibasic acids, this is intended to include their equivalent compounds such as the anhydrides, esters of $C_1$ to $C_3$ alcohols as well as acid chlorides; and similarly when speaking generically of the cyclic diols, this is intended to include their esters such as diacetates.

Having described the general nature and specific examples of the invention, it will be further understood that this has been done mainly for purposes of illustration rather than limitation. The ultimate scope and spirit of the invention is more particularly pointed out in the appended claims.

What is claimed is:

1. A resinous condensation product comprising a polyester of bis-acetoxymethyl durene and of a saturated $C_4$ to $C_{10}$ dicarboxylic acid, heated together in about equimolar amounts to a temperature at which condensation occurs with continued heating of the resulting polyester until it is polymerized into a normally solid high-melting resin.

2. A fiber-forming high-melting polyester resin comprising a polyester of bis-acetoxymethyl durene and of a saturated $C_4$ to $C_{10}$ dicarboxylic acid, said durene and said acid being employed in substantially equimolar amounts.

3. A fiber-forming high-melting resin which comprises a polyester of bis-acetoxymethyl durene and of a saturated $C_4$ to $C_8$ dicarboxylic aliphatic acid containing an even number of carbon atoms per molecule, said durene and said acid being employed in substantially equimolar amounts.

4. A resin according to claim 3 wherein the dicarboxylic acid is suberic acid.

5. A process for preparing fiber-forming polyester resins which comprises heating to a temperature at which condensation occurs a mixture of a saturated dicarboxylic acid with about an equimolar amount of bis-acetoxymethyl durene to form the polyester thereof, and continuing the heating until the mixture polymerizes into a normally solid, high-melting resin.

6. A process for preparing vapor-forming polyester resins which comprises heating to a temperature at which condensation occurs a mixture of a $C_4$ to $C_8$ saturated dicarboxylic aliphatic acid having an even number of carbon atoms per molecule with about an equimolar amount of bis-acetoxymethyl durene to form the polyester thereof, and continuing the heating until the mixture polymerizes into a normally solid high-melting resin.

7. A process according to claim 6 wherein the mole ratio of the saturated dicarboxylic aliphatic acid to the bis-acetoxymethyl durene is between about 1.02 and 1.10 in the mixture.

8. A process according to claim 6 wherein the aliphatic dicarboxylic acid is suberic acid.

9. A process according to claim 6 wherein the aliphatic dicarboxylic acid is adipic acid.

References Cited in the file of this patent

UNITED STATES PATENTS

| | | |
|---|---|---|
| 2,437,232 | Rothrock et al. | Mar. 2, 1948 |
| 2,621,168 | Ross et al. | Dec. 9, 1952 |